United States Patent
Chandran et al.

(10) Patent No.: US 11,257,276 B2
(45) Date of Patent: Feb. 22, 2022

(54) APPEARANCE SYNTHESIS OF DIGITAL FACES

(71) Applicants: DISNEY ENTERPRISES, INC., Burbank, CA (US); ETH Zürich (Eidgenössische Technische Hochschule Zürich), Zurich (CH)

(72) Inventors: Prashanth Chandran, Zurich (CH); Dominik Thabo Beeler, Egg (CH); Derek Edward Bradley, Zurich (CH)

(73) Assignees: DISNEY ENTERPRISES, INC., Burbank, CA (US); ETH ZURICH, (EIDGENÖSSISCHE TECHNISCHE HOCHSCHULE ZÜRICH), Zurich (CH)

( * ) Notice: Subject to any disclaimer, the term of this patent is extended or adjusted under 35 U.S.C. 154(b) by 0 days.

(21) Appl. No.: 16/895,734

(22) Filed: Jun. 8, 2020

(65) Prior Publication Data

US 2021/0279938 A1   Sep. 9, 2021

Related U.S. Application Data

(60) Provisional application No. 62/985,839, filed on Mar. 5, 2020.

(51) Int. Cl.
*G06T 17/00* (2006.01)
*G06T 15/10* (2011.01)
(Continued)

(52) U.S. Cl.
CPC .............. *G06T 15/04* (2013.01); *G06N 3/04* (2013.01); *G06N 3/08* (2013.01); *G06T 15/10* (2013.01); *G06T 17/00* (2013.01); *G06T 2200/04* (2013.01)

(58) Field of Classification Search
None
See application file for complete search history.

(56) References Cited

U.S. PATENT DOCUMENTS 10,891,723 B1 *   1/2021   Chung ...................... G06T 5/40
2010/0134487 A1 *   6/2010   Lai ........................... G06T 17/00
                                                                  345/419

(Continued)

OTHER PUBLICATIONS

Abrevaya et al., "A Decoupled 3D Facial Shape Model by Adversarial Training", CoRR abs/1902.03619, http://arxiv.org/abs/1902.03619, 2019, 17 pages, Feb. 10, 2019.

(Continued)

*Primary Examiner* — Joni Hsu
(74) *Attorney, Agent, or Firm* — Artegis Law Group, LLP

(57) ABSTRACT

Techniques are disclosed for generating digital faces. In some examples, a style-based generator receives as inputs initial tensor(s) and style vector(s) corresponding to user-selected semantic attribute styles, such as the desired expression, gender, age, identity, and/or ethnicity of a digital face. The style-based generator is trained to process such inputs and output low-resolution appearance map(s) for the digital face, such as a texture map, a normal map, and/or a specular roughness map. The low-resolution appearance map(s) are further processed using a super-resolution generator that is trained to take the low-resolution appearance map(s) and low-resolution 3D geometry of the digital face as inputs and output high-resolution appearance map(s) that align with high-resolution 3D geometry of the digital face. Such high-resolution appearance map(s) and high-resolution 3D geometry can then be used to render standalone images or the frames of a video that include the digital face.

20 Claims, 9 Drawing Sheets
(2 of 9 Drawing Sheet(s) Filed in Color)

(51) Int. Cl.
G06T 15/04 (2011.01)
G06N 3/08 (2006.01)
G06N 3/04 (2006.01)

(56) References Cited

U.S. PATENT DOCUMENTS

| | | | | |
|---|---|---|---|---|
| 2015/0254502 | A1* | 9/2015 | Lim | G06K 9/00214 |
| | | | | 700/118 |
| 2017/0357877 | A1* | 12/2017 | Lin | G06F 16/58 |
| 2019/0295302 | A1* | 9/2019 | Fu | G06T 7/0002 |
| 2020/0151559 | A1* | 5/2020 | Karras | G06N 3/088 |
| 2020/0202622 | A1* | 6/2020 | Gallo | G06T 17/205 |
| 2020/0311871 | A1* | 10/2020 | Yu | G06T 3/4053 |

OTHER PUBLICATIONS

Bagautdinov et al., "Modeling Facial Geometry using Compositional VAEs", DOI 10.1109/CVPR.2018.00408, 2018 IEEE/CVF Conference on Computer Vision and Pattern Recognition, 2018, pp. 3877-3886, Dec. 17, 2018.
Beeler et al., "High-Quality Single-Shot Capture of Facial Geometry", http://doi.acm.org/10.1145/1778765.1778777, ACM Transactions on Graphics, vol. 29, No. 4, Article 40, Jul. 2010, pp. 40:1-40:9.
Beeler et al., "Rigid Stabilization of Facial Expressions", DOI: http://dx.doi.org/10.1145/2601097.2601182, ACM Transactions on Graphics, vol. 33, No. 4, Article 44, Jul. 2014, pp. 44:1-44:9.
Blanz et al., "Exchanging Faces in Images", Computer Graphics Forum (2004). vol. 23, No. 3, 2004, pp. 669-676.
Blanz et al., "A Morphable Model For The Synthesis Of 3D Faces", In Proceedings of the 26th Annual Conference on Computer Graphics and Interactive Techniques, SIGGRAPH '99, https://doi.org/10.1145/311535.311556, 1999, pp. 187-194, Jul. 1, 1999.
Booth et al., "A 3D Morphable Model learnt from 10,000 faces", 2016 IEEE Conference on Computer Vision and Pattern Recognition (CVPR), 2016, pp. 5543-5552, Dec. 12, 2016.
Brunton et al., "Multilinear Wavelets: A Statistical Shape Space for Human Faces", CoRR abs/1401.2818, http://arxiv.org/abs/1401.2818, 2014, pp. 1-10, Jan. 13, 2014.
Brunton et al., "Review of Statistical Shape Spaces for 3D Data with Comparative Analysis for Human Faces", CoRR abs/1209.6491, http://arxiv.org/abs/1209.6491, 2012, pp. 1-21, Sep. 28, 2012.
Bulat et al., "How far are we from solving the 2D & 3D Face Alignment problem? (and a dataset of 230,000 3D facial landmarks)", IEEE International Conference on Computer Vision, ICCV 2017, Oct. 22-29, 2017, pp. 1021-1030.
Cao et al., "FaceWarehouse: A 3D Facial Expression Database for Visual Computing", https://doi.org/10.1109/TVCG.2013.249, IEEE Transactions on Visualization and Computer Graphics, vol. 20, No. 3, Mar. 2014, pp. 413-125.
Cao et al., "3D Shape Regression for Real-time Facial Animation", DOI: http://doi.acm.org/10.1145/2461912.2462012, ACM Transactions on Graphics, vol. 32, No. 4, Article 41, Jul. 2013, pp. 41:1-41:10.
Abrevaya et al., "Multilinear Autoencoder for 3D Face Model Learning", In Applications of Computer Vision (WACV), 2018 IEEE Winter Conference, 2018, 10 pages, May 7, 2018.
Ferrari et al., "Dictionary Learning based 3D Morphable Model Construction for Face Recognition with Varying Expression and Pose", In Proceedings of the 2015 International Conference on 3D Vision, 3DV '15, IEEE Computer Society, https://doi.org/10.1109/3DV.2015.63, 2015, pp. 509-517, Nov. 30, 2015.
Gecer et al., "Synthesizing Coupled 3D Face Modalities by Trunk-Branch Generative Adversarial Networks", ArXiv abs/1909.02215, 2019, pp. 1-11, Sep. 2019.
Glorot et al., "Understanding the difficulty of training deep feedforward neural networks", Proceedings of the Thirteenth International Conference on Artificial Intelligence and Statistics 9, May 13-15, 2010, pp. 249-256.

Gulrajani et al., "Improved Training of Wasserstein GANs", CoRR abs/1704.00028, http://arxiv.org/abs/1704.00028, 2017, pp. 1-20, Dec. 4, 2017.
Isola et al., "Image-to-Image Translation with Conditional Adversarial Networks", arXiv:1611.07004v3, 2016, pp. 1-17, Nov. 21, 2016.
Jiang et al., "Disentangled Representation Learning for 3D Face Shape", In IEEE Conference on Computer Vision and Pattern Recognition, (CVPR), arXiv:1902.09887v2, 2019, pp. 1-15, Feb. 26, 2019.
Kingma et al., "Adam: A Method for Stochastic Optimization", CoRR abs/1412.6980, arXiv:1412.6980v9, 2014, pp. 1-15, Dec. 22, 2014.
Kingma et al., "Auto-Encoding Variational Bayes", CoRR abs/1312.6114, arXiv:1312.6114v10, 2013, pp. 1-14, Dec. 20, 2013.
Lewis et al., "Practice and Theory of Blendshape Facial Models", In Lefebvre,S., Spagnuolo, M. (eds.) Eurographics 2014—State of the Art Reports, The Eurographics Association, https://doi.org/10.2312/egst.20141042, 2014, pp. 1-20.
Li et al., "Learning a model of facial shape and expression from 4D scans", https://doi.org/10.1145/3130800.3130813, ACM Transactions on Graphics, vol. 36, No. 6, Article 194, Nov. 2017, pp. 194:1-194:17.
Lipman et al., "Linear Rotation-invariant Coordinates for Meshes", ACM Transactions on Graphics, Proceedings of ACM SIGGRAPH, vol. 24, No. 3, 2005, pp. 479-487, Jul. 2005.
Neumann et al., "Sparse Localized Deformation Components", https://doi.org/10.1145/2508363.2508417, ACM Transactions on Graphics, vol. 32, No. 6, Article 179, Nov. 2013, pp. 179:1-179:10.
Ranjan et al., "Generating 3D Faces Using Convolutional Mesh Autoencoders", In European Conference on Computer Vision (ECCV), Lecture Notes in Computer Science, https://doi.org/10.1007/978-3-030-01219-9_43, vol. 11207, Sep. 2018, pp. 725-741.
Ribera et al., "Facial Retargeting with Automatic Range of Motion Alignment", DOI: http://dx.doi.org/10.1145/3072959.3073674, ACM Transactions on Graphics, vol. 36, No. 4, Article 154, Jul. 2017, pp. 154:1-154:12.
Simonyan et al., "Very Deep Convolutional Networks for Large-Scale Image Recognition", In International Conference on Learning Representations, arXiv:1409.1556v6, 2015, pp. 1-14.
Tan et al., "Variational Autoencoders for Deforming 3D Mesh Models", In Proceedings of the IEEE Computer Society Conference on Computer Vision and Pattern Recognition, https://doi.org/10.1109/CVPR.2018.00612, 2018, pp. 5841-5850, Jun. 2018.
Thies et al., "Face2Face: Real-Time Face Capture and Reenactment of RGB Videos", DOI:10.1145/3292039, In Proc. Computer Vision and Pattern Recognition (CVPR), IEEE, vol. 62, No. 1, Jan. 2019, pp. 96-104.
Vlasic et al., "Face Transfer with Multilinear Models", https://doi.org/10.1145/1073204.1073209, ACM Transactions on Graphics, vol. 24, No. 3, Jul. 2005, pp. 426-433.
Wang et al., "High-Resolution Image Synthesis and Semantic Manipulation with Conditional GANs", In Proceedings of the IEEE Conference on Computer Vision and Pattern Recognition, 2018, pp. 8798-8807, Dec. 17, 2018.
Wu et al., "An Anatomically-Constrained Local Deformation Model for Monocular Face Capture", https://doi.org/10.1145/2897824.2925882, ACM Trans. Graph., vol. 35, No. 4, Article 115, Jul. 2016, pp. 115:1-115:12.
Karras et al., "A Style-Based Generator Architecture for Generative Adversarial Networks", doi: 10.1109/CVPR.2019.00453, arXiv:1812.04948v3, 2019 IEEE/CVF Conference on Computer Vision and Pattern Recognition (CVPR), 2019, pp. 4396-4405, Jun. 1, 2019.
"GitHub—NVIDIA/pix2pixHD: Synthesizing and manipulating 2048×1024 images with conditional GANs", Retreived on Jul. 1, 2020 from https://github.com/NVIDIA/pix2pixHD, 10 pages.
Huang et al., "Arbitrary Style Transfer in Real-time with Adaptive Instance Normalization", arXiv:1703.06868v2, ICCV, 2017, pp. 1-11, Mar. 20, 2017.
U.S. Appl. No. 16/809,495, entitled "Semantic Deep Face Models" filed Mar. 4, 2020.

* cited by examiner

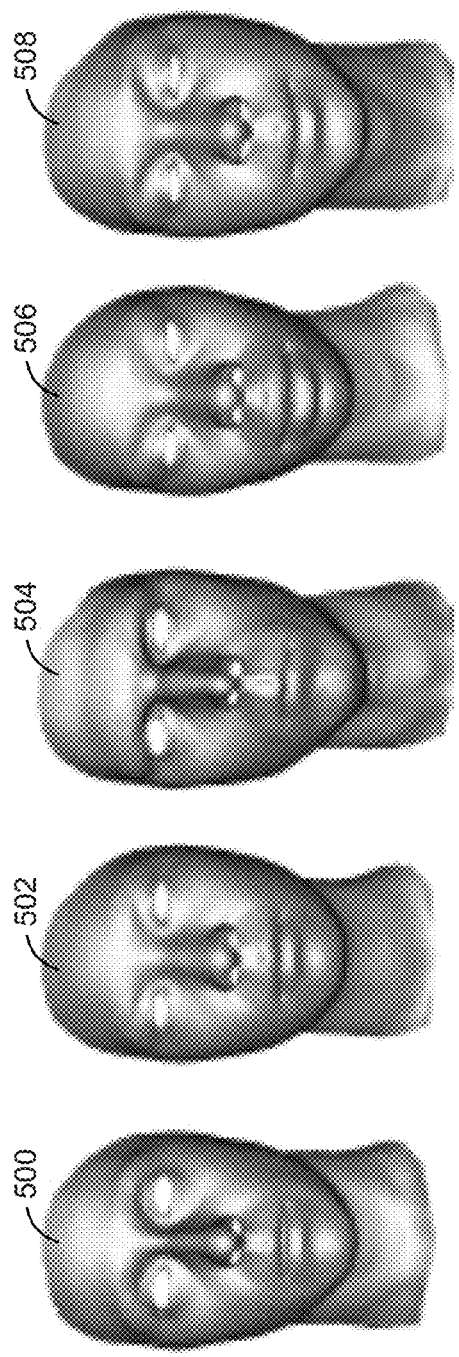
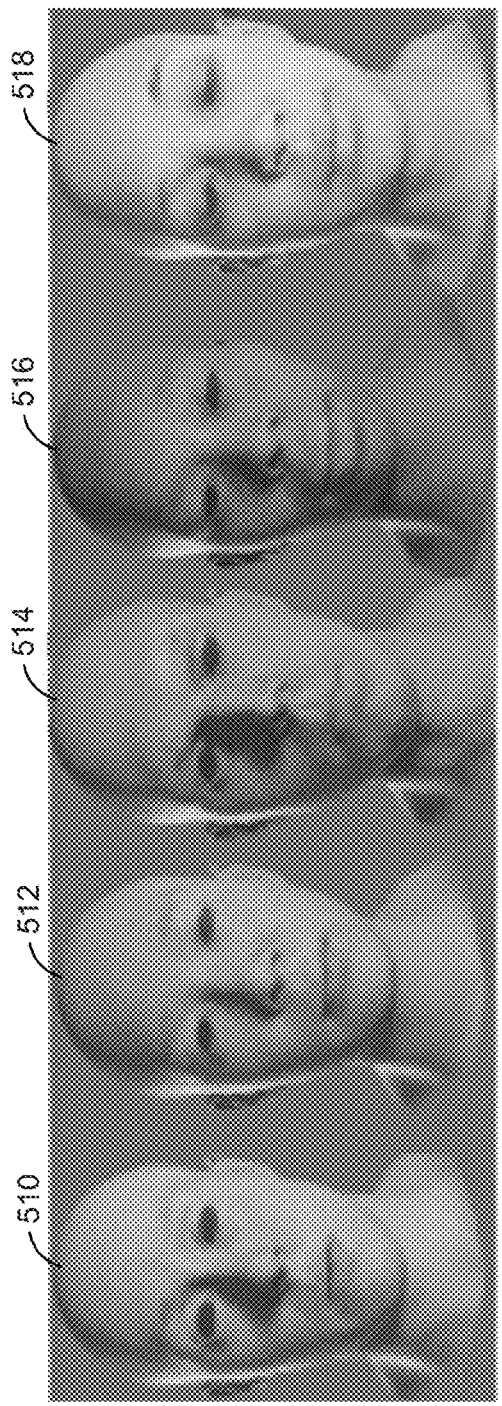
FIG. 5

APPEARANCE SYNTHESIS OF DIGITAL FACES

CROSS-REFERENCE TO RELATED APPLICATIONS

This application claims priority benefit of the United States Provisional Patent Application titled, "APPEARANCE SYNTHESIS OF DIGITAL HUMAN FACES," filed on Mar. 5, 2020 and having Ser. No. 62/985,839. The subject matter of this related application is hereby incorporated herein by reference.

BACKGROUND

Technical Field

Embodiments of the present disclosure relate generally to computer science and computer graphics and, more specifically, to appearance synthesis of digital faces.

Description of the Related Art

Realistic digital faces are required for various computer graphics and computer vision applications. For example, digital faces are oftentimes used in virtual scenes of film productions and video games. Depending on the desired level of quality, an artist can spend hours, days, weeks, or even months trying to create a realistic-looking digital face.

A digital face typically includes three-dimensional (3D) geometry of a face as well as one or more two-dimensional (2D) appearance maps that specify surface characteristics of the face. For example, a texture map is an appearance map that can specify colors on the surface of the face. As another example, a normal map is an appearance map that can specify bumps and dents on the surface of the face. As yet another example, a specular roughness map is an appearance map that can specify shininess on the surface of the face. To render realistic images effectively, the different appearance maps need to align with the 3D geometry of the face. For example, colors associated with facial features such as freckles, moles, and/or blemishes on a texture map should be aligned with the specific 3D geometry of the face corresponding to those facial features. As another example, the colors of a texture map may need be redder in certain locations to align with 3D geometry that conveys an angry face.

Neural generative models have been used in an attempt to generate photorealistic images of faces. However, typical neural generative models do not permit fine-grained control of various characteristics of digital faces, such as the genders, ages, identities, or ethnicities of the digital faces. In addition, such models cannot be used to generate appearance maps that align with the 3D geometries associated with digital faces. As noted above, sufficiently aligned appearance maps are generally required for rendering realistic digital faces.

Currently, there are few, if any, techniques that can generate realistic-looking digital faces, while also providing user control of different facial characteristics, such as those discussed above.

As the foregoing illustrates, what is needed in the art are more effective techniques for generating digital faces.

SUMMARY

One embodiment of the present disclosure sets forth a computer-implemented method for rendering one or more images of a digital face. The method includes generating, via a first machine learning model, one or more first appearance maps based on a user selection of one or more styles associated with one or more attributes of a digital face. The method further includes generating, via a second machine learning model, one or more second appearance maps and a first three-dimensional (3D) geometry associated with the digital face based on the one or more first appearance maps and a second 3D geometry associated with the digital face. In addition, the method includes rendering one or more images including the digital face based on the one or more second appearance maps and the first 3D geometry.

Other embodiments of the present disclosure include, without limitation, a computer-readable medium including instructions for performing one or more aspects of the disclosed techniques as well as a computing device for performing one or more aspects of the disclosed techniques.

At least one technical advantage of the disclosed techniques relative to the prior art is that the disclosed techniques disentangle styles associated with different semantic attributes, such as expression, gender, age, identity, ethnicity, etc., when generating facial appearance maps. This approach enables these types of semantic attributes to be separately controlled by a user via the styles. In addition, the disclosed techniques generate facial appearance maps including details that are more aligned with the details in 3D facial geometry. Such facial appearance maps and 3D facial geometry can be used to render more realistic-looking digital faces relative to conventional approaches. These technical advantages represent one or more technological improvements over prior art approaches.

BRIEF DESCRIPTION OF THE DRAWINGS

The patent or application file contains at least one drawing executed in color. Copies of this patent or patent application publication with color drawings will be provided by the Office upon request and payment of the necessary fee.

So that the manner in which the above recited features of the disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

FIG. 5 illustrates exemplar digital faces generated using the style-based generator and super-resolution generator of FIGS. 1-3, according to various embodiments;

DETAILED DESCRIPTION

In the following description, numerous specific details are set forth to provide a more thorough understanding of the present invention. However, it will be apparent to one of skill in the art that embodiments of the present invention may be practiced without one or more of these specific details.

System Overview

Figure 1:
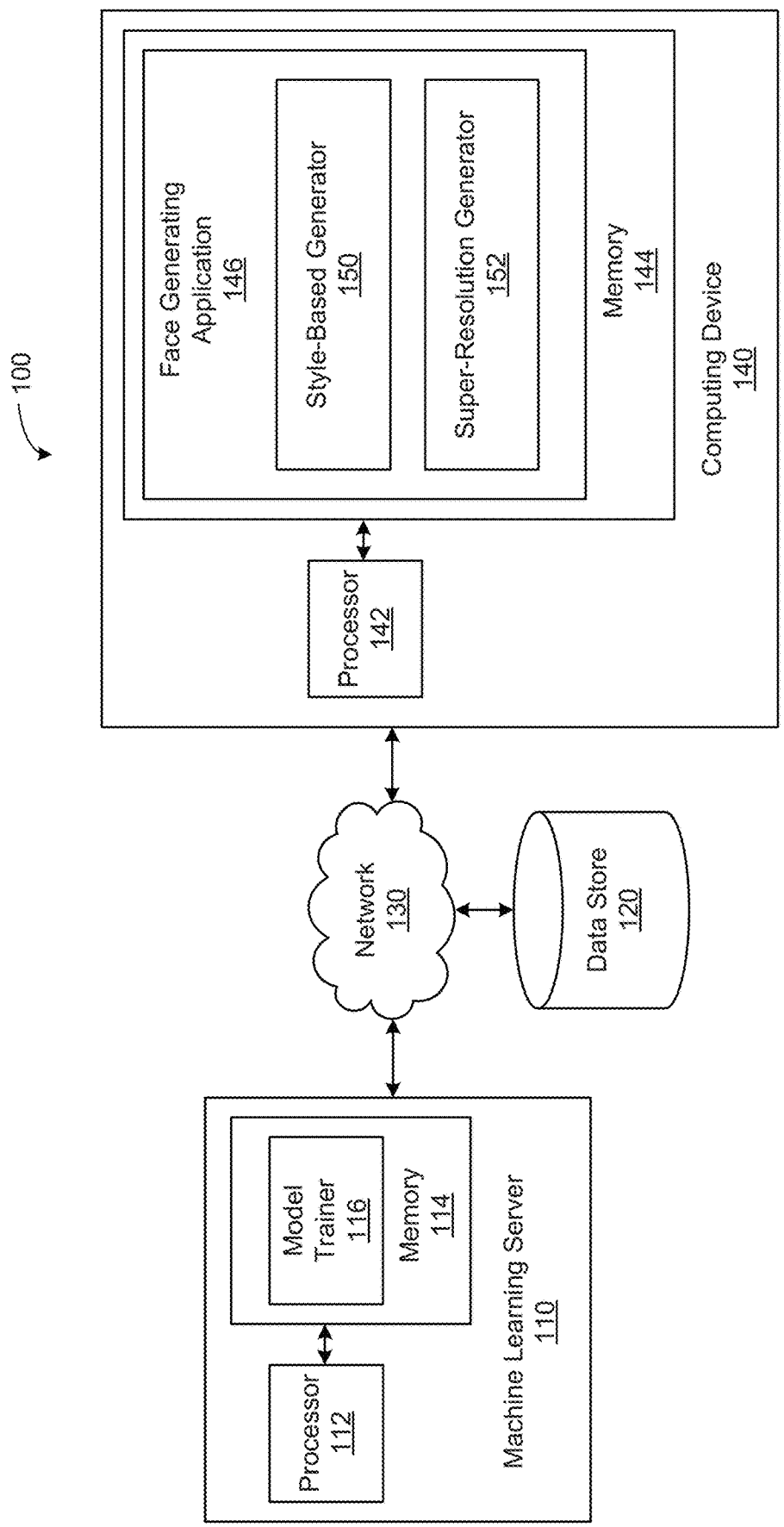
FIG. 1 illustrates a system configured to implement one or more aspects of the various embodiments.

FIG. 1 illustrates a system 100 configured to implement one or more aspects of the various embodiments. As shown, the system 100 includes a machine learning server 110, a data store 120, and a computing device 140 in communication over a network 130, which may be a wide area network (WAN) such as the Internet, a local area network (LAN), or any other suitable network.

As shown, a model trainer 116 executes on a processor 112 of the machine learning server 110 and is stored in a system memory 114 of the machine learning server 110. The processor 112 receives user input from input devices, such as a keyboard, a mouse or a touchscreen. In operation, the processor 112 is the master processor of the machine learning server 110, controlling and coordinating operations of other system components. In particular, the processor 112 may issue commands that control the operation of a graphics processing unit (GPU) that incorporates circuitry optimized for graphics and video processing, including, for example, video output circuitry. The GPU may deliver pixels to a display device that may be any conventional cathode ray tube, liquid crystal display, light-emitting diode display, or the like.

The system memory 114 of the machine learning server 110 stores content, such as software applications and data, for use by the processor 112 and the GPU. The system memory 114 may be any type of memory capable of storing data and software applications, such as a random access memory (RAM), a read-only memory (ROM), an erasable programmable read-only memory (EPROM or Flash ROM), or any suitable combination of the foregoing. In some embodiments, a storage (not shown) may supplement or replace the system memory 114. The storage may include any number and type of external memories that are accessible to the processor 112 and/or the GPU. For example, and without limitation, the storage may include a Secure Digital Card, an external Flash memory, a portable compact disc read-only memory (CD-ROM), an optical storage device, a magnetic storage device, or any suitable combination of the foregoing.

It will be appreciated that the machine learning server 110 shown herein is illustrative and that variations and modifications are possible. For example, the number of processors 112, the number of GPUs, the number of system memories 114, and the number of applications included in the system memory 114 may be modified as desired. Further, the connection topology between the various units in FIG. 1 may be modified as desired. In some embodiments, any combination of the processor 112, the system memory 114, and a GPU may be replaced with any type of virtual computing system, distributed computing system, or cloud computing environment, such as a public, private, or a hybrid cloud.

The model trainer 116 is configured to train machine learning models, including a style-based generator machine learning model 150, which is also referred to herein as the style-based generator 150, and a super-resolution generator machine learning model 152, which is also referred to herein as the super-resolution generator 152. In some embodiments, the style-based generator 150 and the super-resolution generator 152 are artificial neural networks that generate low-resolution (e.g., 64 pixel×64 pixel) appearance map(s) and residuals that can be used to transform upscaled versions of the low-resolution appearance map(s) and low-resolution 3D geometry associated with a digital face to high-resolution appearance map(s) and high-resolution 3D geometry associated with the digital face, respectively. Example architectures of the style-based generator 150, as well as techniques for training and using the same, are discussed in greater detail below in conjunction with FIGS. 2-4 and 7-9.

As discussed in greater detail below, the style-based generator 150 takes as inputs (1) initial tensor(s), and (2) one or more style vector(s) for different semantic attributes. The initial tensor(s) are 3D tensors including predetermined noise, and the initial tensor(s) are input into the style-based generator 150 to generate corresponding appearance map(s). Each of the style vector(s) represents a particular style of a semantic attribute, and the style vector(s) are used to control adaptive instance normalization (AdaIN) operations within semantics transfer blocks of the style-based generator 150. Embodiments may utilize any suitable semantic attributes that relate to different qualities of a digital face, such as expression, gender, age, identity, ethnicity, etc., as well as styles thereof that are represented by corresponding style vectors. For example, an age attribute could be associated with styles for "young," "middle-aged," and "old" that are represented by corresponding style vectors. In such a case, the style vector associated with an "old" face may be used to control the AdaIN operations within semantics transfer blocks of the style-based generator 150 to add noise with a large variance.

Style vectors can be used to disentangle different semantic attributes so that those attributes can be controlled separately by a user. In some embodiments, the style vector(s) input into the style-based generator 150 can be determined based on user-selected style(s). For example, the user could select, via a user interface, a single style for some semantic attributes, such as a particular age (or age range) that is represented by a corresponding style vector associated with the age attribute. As another example, the user could select a combination of styles for some semantic attributes, such as a combination of different expressions, identities, and/or ethnicities. For example, a user could specify that a particular digital face includes 50% of one ethnicity and 50% of another ethnicity, in which case the style vectors corresponding to those ethnicities could be combined using a weighted sum of 0.5 times each of the style vectors.

In some embodiments, the initial tensor(s) and the style vector(s) that are input into the style-based generator 150, as well as layers within semantics transfer blocks of the style-based generator 150 and weights used to combine outputs of such layers for different semantic attributes, are jointly learned during training of the style-based generator 150. In such cases, the initial tensor(s) and style vector(s) that are input into the style-based generator can be optimized during training and fixed thereafter when the style-based generator 150 is deployed. In particular, the initial tensor(s) can be optimized for reconstructing different types of appearance map(s) in training data, while the style vector(s) can be optimized for reconstructing appearance map(s) that are labeled with corresponding semantic style(s) in the training data.

The style-based generator 150 outputs low-resolution appearance map(s), such as a low-resolution texture map, normal map, and/or specular roughness map. The low-resolution appearance map(s) is upscaled to a larger size using, e.g., bilinear upsampling. The upscaled low-resolution appearance map(s) can then be input, along with low-resolution 3D geometry of a digital face, into the super-resolution generator 152. The super-resolution generator 152 is an image-to-image translation model that jointly upsamples upscaled low-resolution appearance map(s) and low-resolution 3D geometry to generate high-resolution appearance map(s) that are aligned with a high-resolution 3D geometry. The low-resolution 3D geometry can be generated in any technically-feasible manner, such as using the same user-selected styles and a non-linear model for generating 3D facial geometry. Examples of such non-linear models, including variational autoencoders, are disclosed in U.S. patent application Ser. No. 16/809,495, entitled "SEMANTIC DEEP FACE MODELS" and filed on Mar. 4, 2020, which is incorporated by reference herein in its entirety. In some embodiments, the low-resolution 3D geometry is represented as a 2D image, such as an image in which every pixel value represents a 3D location or a macroscopic displacement map in the domain of a UV mesh. When the super-resolution generator 152 upsamples the upscaled low-resolution appearance map(s) along with the low-resolution 3D geometry, high-resolution details are added that are aligned in the high-resolution appearance map(s) and the high-resolution 3D geometry output by the super-resolution generator 152. For example, the high-resolution appearance map(s) could include a texture map having colors associated with facial features such as freckles, moles, and/or blemishes that are aligned with particular 3D geometry corresponding to those facial features in the high-resolution 3D geometry. As another example, a high-resolution texture map generated by the super-resolution generator 152 could be redder in certain locations to align with particular 3D geometry conveying an angry face.

In some embodiments, the super-resolution generator 152 is a fully convolutional residual network, such as a pix2pixHD network or variant thereof. In such cases, rather than generating the high resolution appearance map(s) and the high resolution 3D geometry themselves, the super-resolution generator 152 may generate residuals, which are differences that can be added to the upscaled low-resolution appearance map(s) and the low-resolution 3D geometry to obtain the high-resolution appearance map(s) and the high-resolution 3D geometry, respectively.

Although described herein primarily with respect to low-resolution appearance map(s) generated by the style-based generator 150, in alternative embodiments, the super-resolution generator 152 may take as inputs low-resolution 3D geometry and upscaled low-resolution appearance map(s) that are created manually or generated according to other techniques. For example, the non-linear model disclosed in U.S. patent application Ser. No. 16/809,495 could be trained to jointly generate low-resolution 3D geometry and low-resolution appearance map(s), which can then be upscaled. However, these other techniques may not enable the same user control of semantic attributes, such as expression, gender, age, identity, ethnicity, etc., that the style-based generator 150 enables.

Training data and/or trained machine learning models, including the style-based generator 150 and the super-resolution generator 152, may be stored in the data store 120 and deployed in any suitable applications, such as a face generating application 146. In some embodiments, the training data includes (1) low-resolution appearance maps and corresponding style labels for training the style-based generator 150, and (2) upscaled low-resolution appearance maps, low-resolution 3D geometry associated with different digital faces, as well as corresponding high-resolution appearance maps and high-resolution 3D geometry associated with the digital faces, for training the super-resolution generator 152. For example, the high-resolution appearance maps and the high-resolution 3D geometry associated with the digital faces could be obtained from captured images and/or videos of human faces, and the low-resolution and upscaled low-resolution appearance maps, as well as the low-resolution 3D geometry, could be downscaled and downsampled, or only downsampled, versions of the high-resolution appearance maps and the high-resolution 3D geometry, respectively. In addition, style labels corresponding to subject metadata (e.g., gender, age, identity, ethnicity, etc.), which are necessary for training style vectors, can also be acquired during such data capture. In some embodiments, the style-based generator 150 can be trained using progressive training techniques, as described in greater detail below in conjunction with FIG. 7. In addition, the super-resolution generator 152 can be trained using ground-truth and adversarial learning techniques, as described in greater detail below in conjunction with FIG. 8. In some embodiments, the data store 120 may include any storage device or devices, such as fixed disc drive(s), flash drive(s), optical storage, network attached storage (NAS), and/or a storage area-network (SAN). Although shown as accessible over the network 130, in some embodiments the machine learning server 110 may include the data store 120.

Illustratively, the face generating application 146 is stored in a memory 144, and executes on a processor 142 of the computing device 140. Components of the computing device 140, including the memory 144 and the processor 142, may be similar to corresponding components of the machine learning server 110. As shown, the face generating application 146 includes the style-based generator 150 and the super-resolution generator 152. More generally, the style-based generator 150 and the super-resolution generator 152 may be deployed to any suitable applications. For example, the face generating application 146 could be an application that uses the style-based generator 150 and the super-resolution generator 152 to generate and render digital faces in standalone images or the frames of a video.

The number of machine learning servers and computing devices may be modified as desired. Further, the functionality included in any of the applications may be divided across any number of applications or other software that are stored and execute via any number of devices that are located in any number of physical locations.

Generating and Rendering Digital Faces

Figure 2:
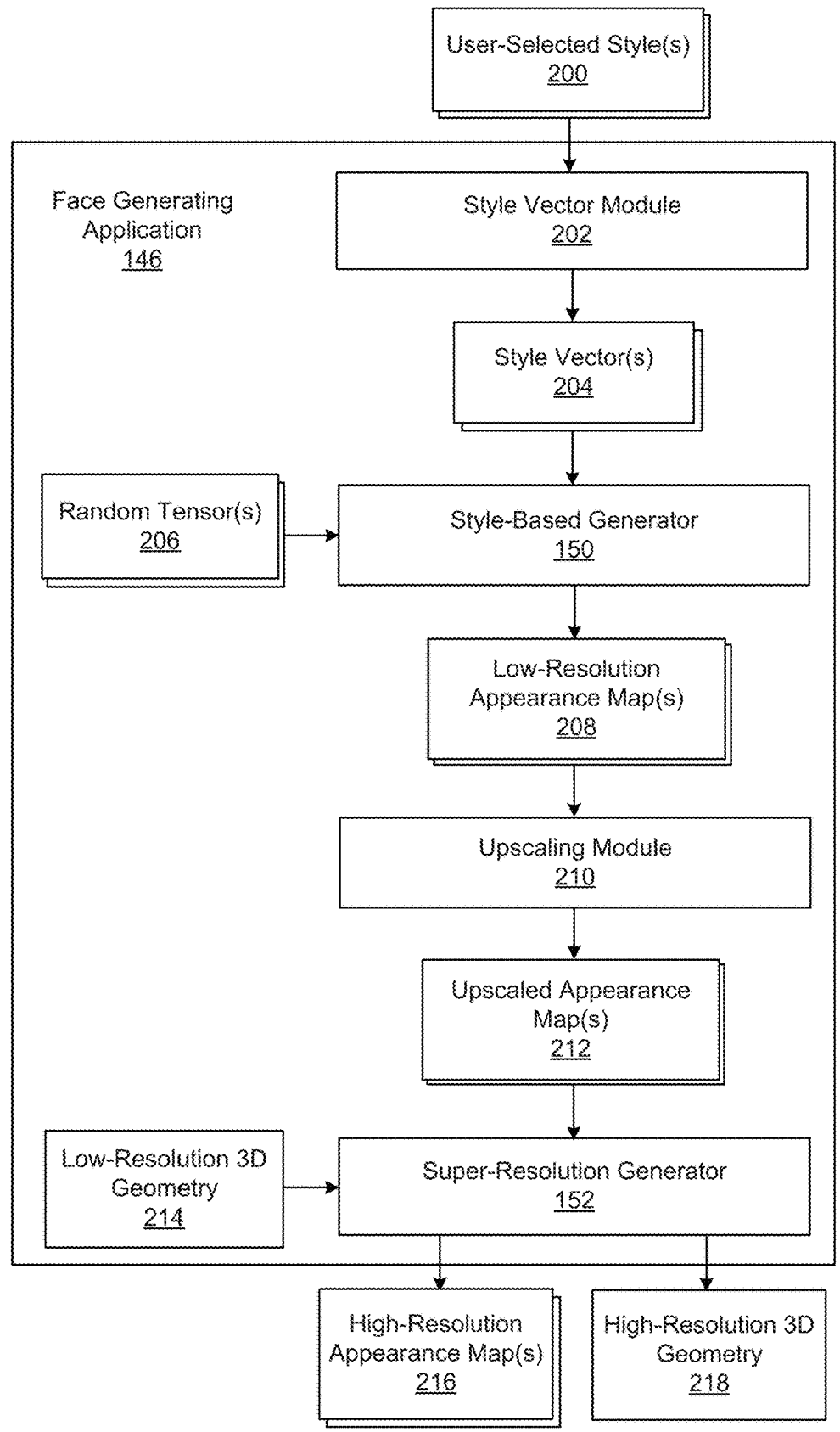
FIG. 2 is a more detailed illustration of the face generating application of FIG. 1, according to various embodiments.

FIG. 2 is a more detailed illustration of the face generating application 146 of FIG. 1, according to various embodiments. As shown, a style vector module 202 of the face generating application 146 determines style vector(s) 204 to input into the style-based generator 150 based on user-selected style(s) 200 for different semantic attributes. In embodiments, a user can select the style(s) 200 in any technically feasible manner, such as via sliders, drop-down menus, checkboxes, or text input fields on a graphical user interface provided by the face generating application 146. Further, the user can select a single style for a semantic attribute or a combination of styles that is represented by a weighted sum of corresponding style vectors. For example, the user could select a single style (e.g., old) for an age attribute and a combination of styles for the expression, identity, and/or ethnicity attributes.

Figure 3:
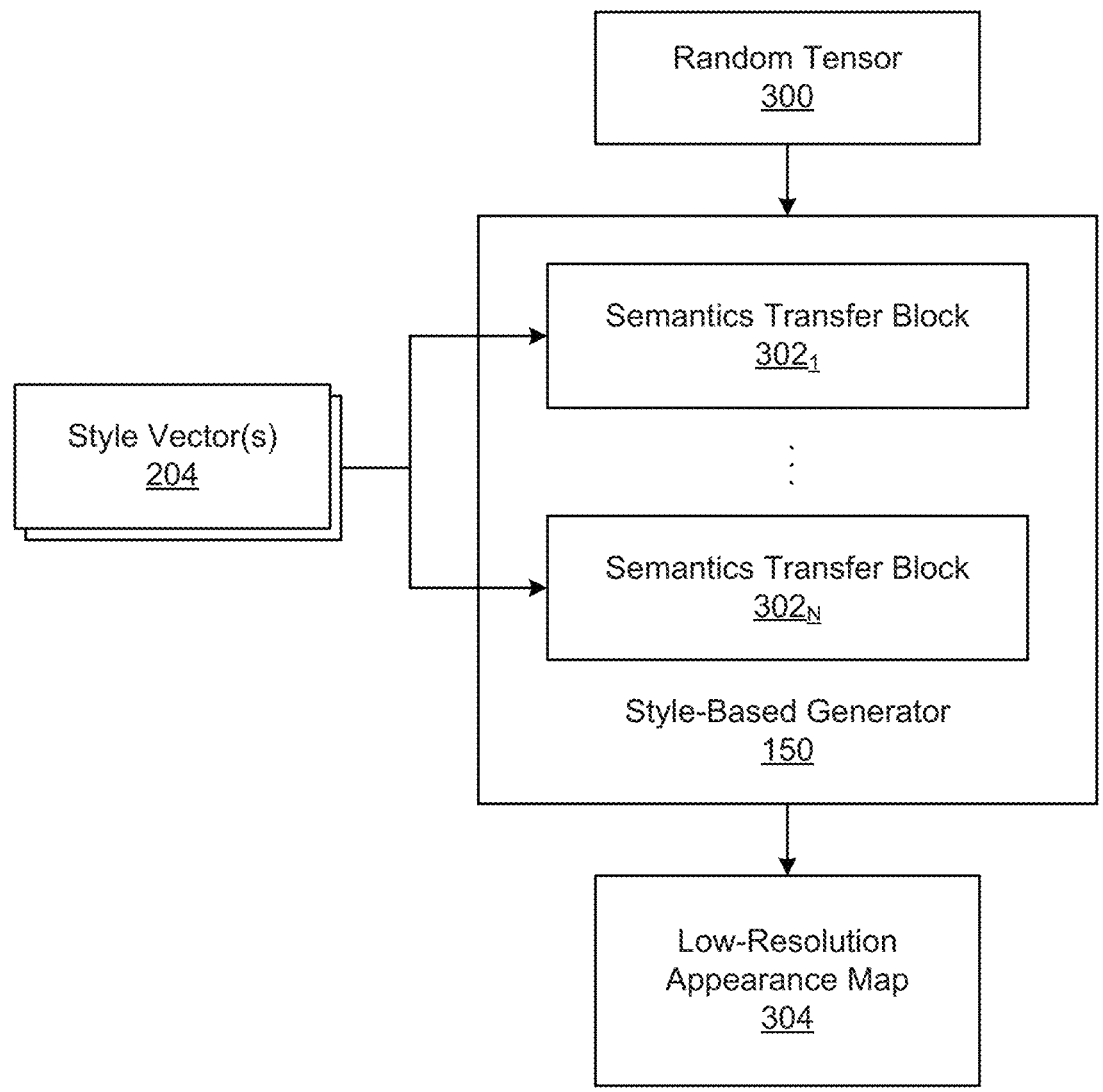
FIG. 3 is a more detailed illustration of the style-based generator of FIG. 2, according to various embodiments.

Illustratively, the face generating application 146 inputs the style vector(s) 204 and one or more initial tensor(s) 206 into the style-based generator 150. Given such inputs, the style-based generator 150 outputs one or more low-resolution appearance map(s) 208, such as a texture map, a normal map, a specular roughness map, etc. FIG. 3 is a more detailed illustration of the style-based generator of FIG. 2, according to various embodiments. As shown, the style-based generator 150 is a convolutional neural network that includes multiple semantics transfer blocks $302_1$ to $302_N$ (referred to herein collectively as "semantics transfer blocks 302" and individually as "a semantics transfer block 302"). As described in greater detail below, each of the semantics transfer blocks 302 takes as input an image at a particular scale (or multiple such images) and generates an image (or multiple images) at a next larger scale. For example, one of the semantics transfer blocks 302 could take as input a 32 pixel×32 pixel image and output a 64 pixel×64 pixel image.

Starting from an initial tensor 300, the style-based generator 150 repeatedly upscales lower-resolution images using the semantics transfer blocks 302, until a low-resolution appearance map 304 is generated and output by the style-based generator 150. Aside from the output of a last semantics transfer block 302 in the style-based generator 150, each of the images that are input into, and output by, the semantics transfer blocks 302 represents an appearance map at a lower resolution than the low-resolution appearance map 304 output by the style-based generator 150. Although one initial tensor 300 and one low-resolution appearance map 304 are shown for illustrative purposes, in other embodiments, the style-based generator can receive multiple initial tensors (e.g., the initial tensor(s) 206 described above in conjunction with FIG. 2) as inputs and output multiple corresponding low-resolution appearance maps (e.g., the low-resolution appearance map(s) 208 described above in conjunction with FIG. 2).

Illustratively, the style vector(s) 204 are used to control the semantics transfer blocks 302, and in particular to control AdaIN operations therein. As a result, details relating to semantic styles represented by the style vector(s) 204 are added at each of the semantics transfer blocks 302. As described in greater detail below, the details relating to semantic attributes such as expression, gender, age, identity, and/or ethnicity can be added in parallel, and the resulting images combined using a weighted sum, in each of the semantics transfer blocks 302. Such a parallel application of semantic styles ensures that each style only affects one aspect of the image generated by a semantics transfer block 302, while the weighted sum ensures that none of the styles can be ignored by the subsequent blocks.

Figure 4:
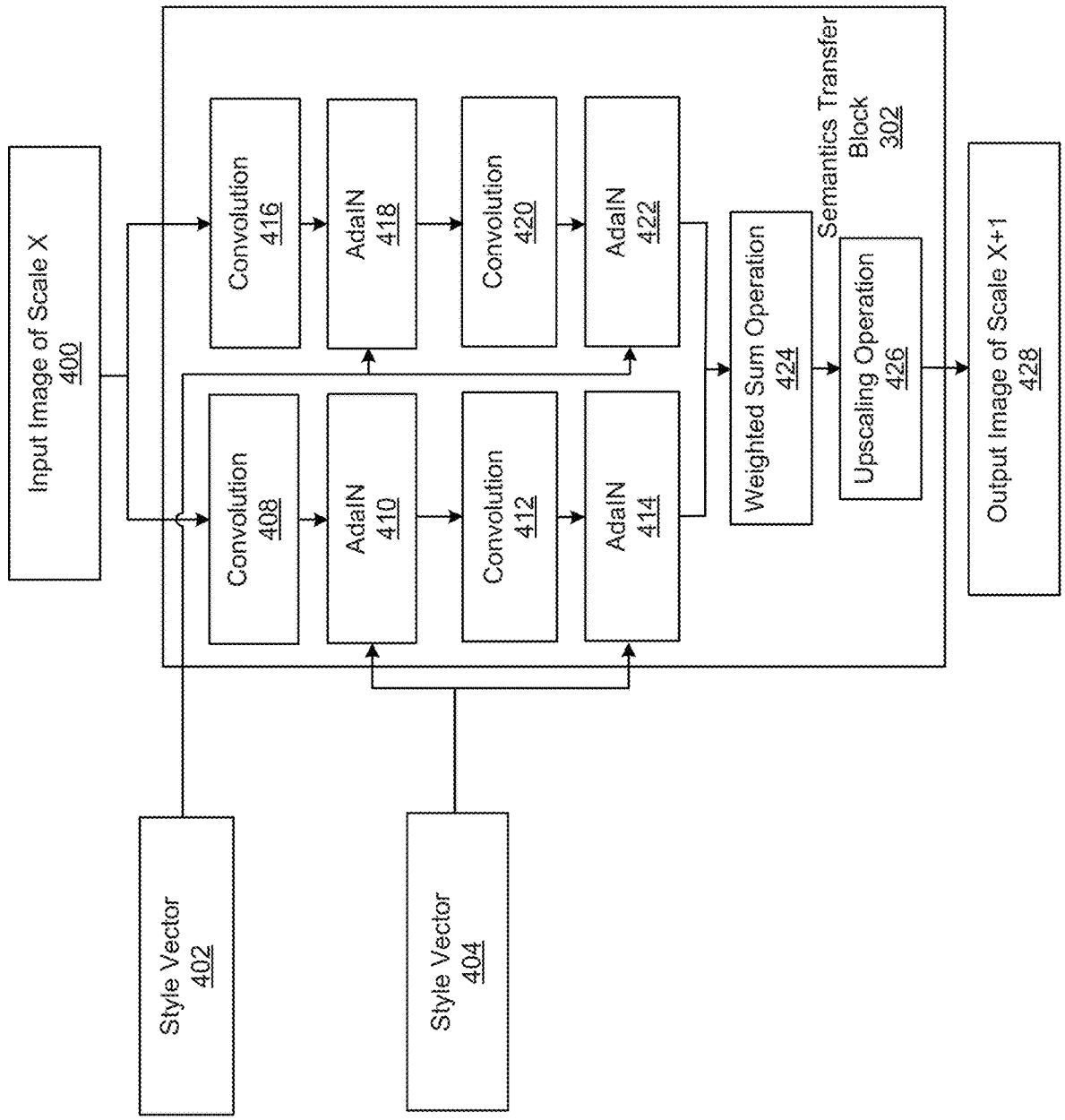
FIG. 4 is a more detailed illustration of a semantics transfer block included in the style-based generator of FIG. 3, according to various embodiments.

FIG. 4 is a more detailed illustration of one of the semantics transfer blocks 302 included in the style-based generator 150 of FIG. 3, according to various embodiments. As shown, the semantics transfer block 302 includes two sets of convolution and AdaIN layers, which include (1) convolution layers 408 and 412 and AdaIN layers 410 and 414 (i.e., a first set of convolution and AdaIN layers), and (2) convolution layers 416 and 420 and AdaIN layers 418 and 422 (i.e., a second set of convolution and AdaIN layers), that are associated with different semantic attributes and process an input image 400 in parallel. Each of the convolution layers 408, 412, 416, and 420 is used to perform a convolution operation, and each of the AdaIN layers 410, 414, 418, and 422 is used to perform an AdaIN operation. Convolution operations are mathematical operations on two functions that produces a third function expressing how the shape of one of the original functions is modified by the other original function. AdaIN operations are normalizations that can be used to transfer statistics from semantic styles onto convolution channels. Although two pairs of convolution and AdaIN layers (e.g., convolution layer 408 and AdaIN layer 410 and convolution layer 412 and AdaIN layer 414) are shown in each of the sets of convolution and AdaIN layers that process the input image 400 in parallel, any number of convolution and AdaIN layer pairs may be used in each set of convolution and AdaIN layers in other embodiments.

As shown, the input image 400 is a lower resolution image of scale X that is being upscaled to a higher resolution output image 428 of scale X+1. For example, the input image 400 could be a 32 pixel×32 pixel image, and the output image 428 could be a 64 pixel×64 pixel image. Accordingly, the style-based generator 150 generates the low-resolution appearance map 304 by repeatedly upscaling lower-resolution images using semantics transfer blocks 302, starting from the initial tensor 300.

The style vector(s) 404 and 402 control the AdaIN operations performed by the AdaIN layers 410 and 414 and the AdaIN layers 418 and 422, respectively, that are associated with different semantic attributes. For example, a style vector associated with an old age attribute could be used to control the AdaIN operations within semantics transfer blocks to add noise with a large variance, as described above in conjunction with FIG. 1. Other semantic attributes may permit styles associated with different semantic attributes to be combined together, such as multiple different expressions, identities, and/or ethnicities, and the resulting style vector can be used to control AdaIN operations to produce appearance map(s) that include the combined styles.

As shown, a weighted sum operation 424 is performed to combine images output by the parallel sets of convolution and AdaIN layers associated with different semantic attributes. As described, in some embodiments, the weights used in such a weighted sum operation 424 can be learned during training along with the convolution layers 408, 412, 416, and 420; the AdaIN layers 410, 414, 418, and 422; the style vectors for different semantic attributes; and the initial tensor 300.

Subsequent to performing the weighted sum operation, an upscaling operation 426 is performed to upscale the image produced by the weighted sum operation 424. In some embodiments, the upscaling operation 426 includes a bilinear interpolation. In other embodiments, the upscaling operation 426 may be performed using another convolution layer. The upscaled image is then output by the semantics transfer block 302 as an output image 428 of scale X+1. As described, multiple semantics transfer blocks 302 can be applied in succession to generate the low-resolution appearance map 304 that is output by the style-based generator 304.

Returning to FIG. 2, the low-resolution appearance map 208 that is output by the style-based generator 150 is upscaled, by an upscaling module 210 of the face generating application 146, to produce upscaled low-resolution appearance maps(s) 212 (also referred to herein as "upscaled appearance maps") that are larger in size. For example, the upscaling module 210 could upscale a 64 pixel×64 pixel appearance map to a 1024 pixel×1024 pixel appearance map. In some embodiments, the upscaling module 210 performs a naïve upscaling, such as a bi-linear upsampling. As a result, the resulting upscaled appearance maps(s) 212 can be a blurry image that lacks the high-resolution, fine details that contribute to the photo-realistic appearance of a digital face. Nevertheless, the upscaled appearance maps(s) 212 can encapsulate the global structure of the target appearance and geometry maps, such as the expression, gender, ethnicity, etc. associated with the digital face.

In order to add high-resolution details to the upscaled appearance map(s) 212 and a low-resolution 3D geometry 214 associated with a digital face, the face generating application 146 inputs the upscaled appearance map(s) 212 and the low-resolution 3D geometry 214 into the super-resolution generator 152. In some embodiments, the low-resolution 3D geometry 214 can also be represented in a 2D format, such as an image whose pixels represent 3D coordinates or a displacement map. The super-resolution generator 152 is an image-to-image translation model that jointly upsamples the upscaled appearance map(s) 212 and the low-resolution 3D geometry 214. Doing so produces high-resolution appearance map(s) 216 that align with high-resolution 3D geometry 218. As described, in some embodiments, the super-resolution generator 152 is a fully convolutional residual network, such as a pix2pixHD network or a variant thereof. In such cases, the super-resolution network 152 outputs residuals that the face generating application 146 can add on top of the upscaled appearance map(s) 212 and the low-resolution 3D geometry 214 to produce the high-resolution appearance map(s) 216 and the high-resolution 3D geometry 218, respectively. As described, details in the high-resolution appearance map(s) 216 can be aligned with the high-resolution 3D geometry 218. For example, the high-resolution appearance map(s) 216 could include a texture map having colors associated with facial features such as freckles, moles, and/or blemishes that are aligned with particular 3D geometry corresponding to those facial features in the high-resolution 3D geometry 218, or the high-resolution appearance map(s) 216 could include a texture map that is redder in certain locations to align with particular 3D geometry conveying an angry face.

In alternative embodiments, the super-resolution generator 152 can take as inputs a low-resolution 3D geometry associated with a digital face and upscalings of low-resolution appearance map(s) that are generated without using the style-based generator 150. For example, in some embodiments, the low-resolution 3D geometry and low-resolution appearance map(s) may be generated using the non-linear model disclosed in U.S. patent application Ser. No. 16/809, 495. As another example, the low-resolution 3D geometry and low-resolution appearance map(s) could be created manually.

FIG. 5 illustrates exemplar digital faces generated using the style-based generator 150 and the super-resolution generator 152 of FIG. 1, according to various embodiments. In this example, the style-based generator 150 was used to generate low-resolution albedo maps for five faces associated with the same neutral expression and male gender styles, but different identity and ethnicity styles. Albedo maps are texture maps specifying surface colors, but with highlights and shadows removed. The low-resolution albedo maps generated by the style-based generator 150 were upscaled and input into the super-resolution generator 152 along with low-resolution 3D geometries 500, 502, 504, 506, and 508 associated with the same styles. Given such inputs, the super-resolution generator 152 upsamples the low-resolution albedo maps and the low-resolution 3D geometries 500, 502, 504, 506, and 508 to generate high-resolution albedo maps and corresponding high-resolution geometries. As shown, digital faces 510, 512, 514, 516, and 518 rendered using such high-resolution albedo maps and high-resolution 3D geometries are realistic looking.

Figure 6:
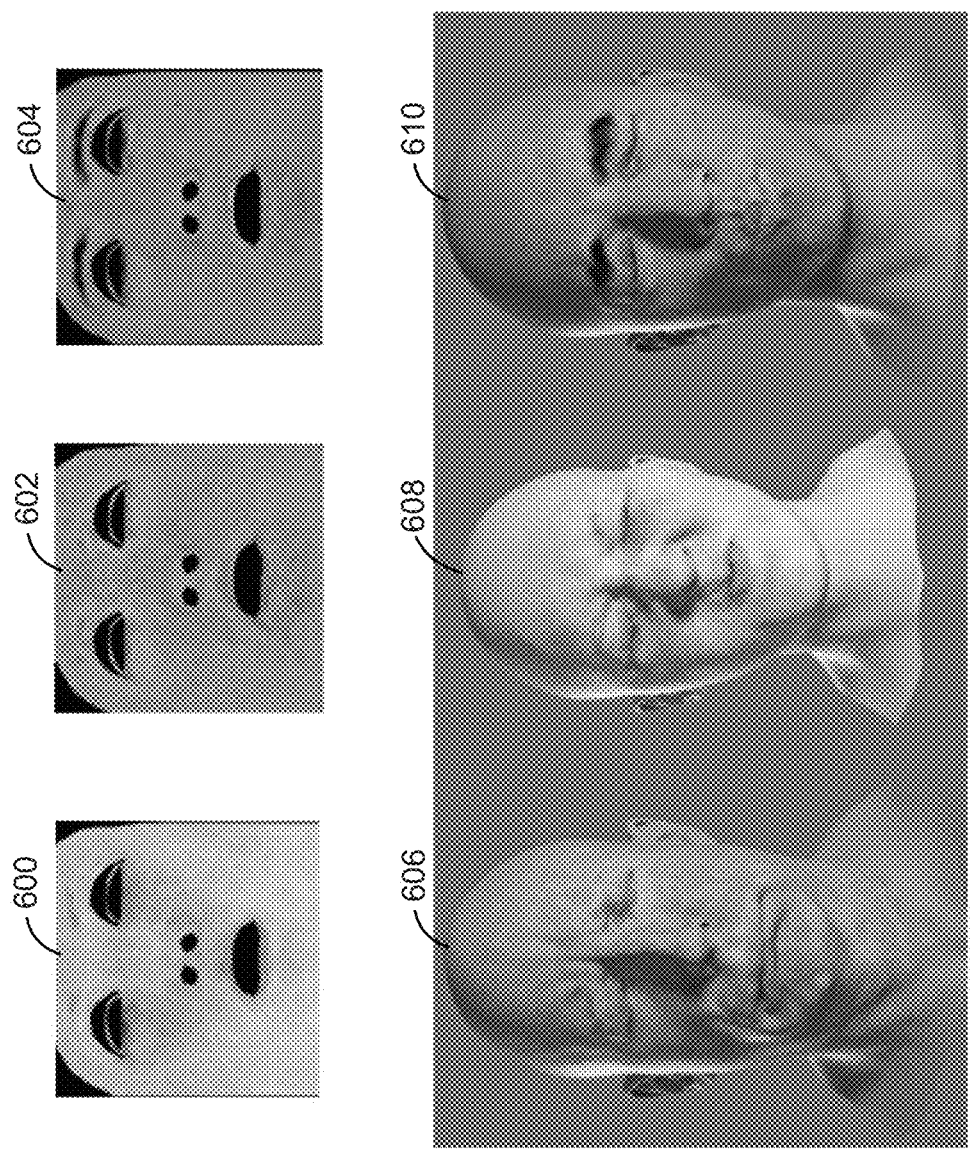
FIG. 6 illustrates exemplar digital faces with an expression that are generated using the style-based generator and the super-resolution generator of FIGS. 1-3, according to various embodiments.

FIG. 6 illustrates exemplar digital faces with an expression that are generated using the style-based generator 150 and the super-resolution generator 152 of FIGS. 1-3, according to various embodiments. As shown, the expression is a "scrunch-face." In this example, the style-based generator 150 was used to generate low-resolution albedo maps for a scrunch-face expression style, different ethnicity styles, and different identity styles. The low-resolution albedo maps were then upscaled and input into the super-resolution generator 152 along with low-resolution 3D geometry associated with the "scrunch-face" expression and the same styles. Given such inputs, the super-resolution generator 152 output albedo maps 600, 602, and 604, as well as corresponding high-resolution 3D geometry. As shown, the albedo maps 600, 602, and 604 and corresponding high-resolution 3D geometry can be used to render digital faces 606, 608, and 610 that look realistic.

Figure 7:
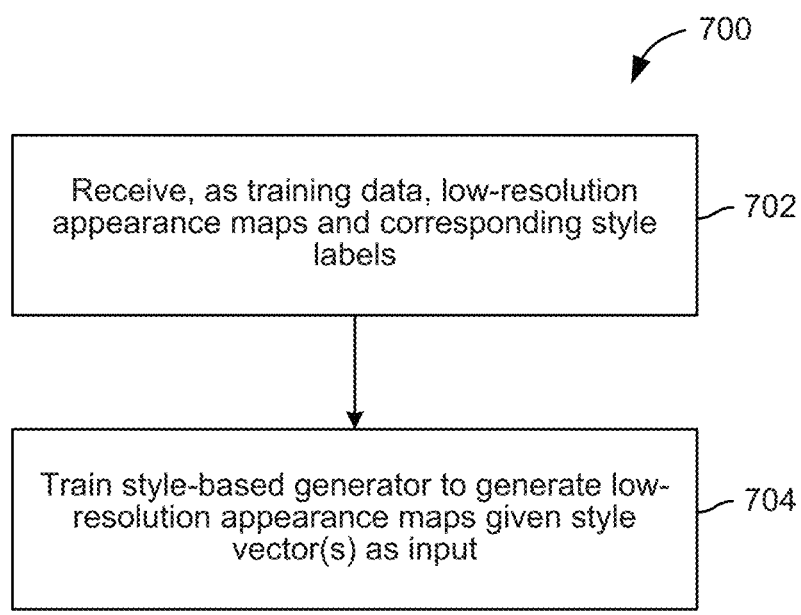
FIG. 7 sets forth a flow diagram of method steps for training the style-based generator of FIGS. 1-3, according to various embodiments.

FIG. 7 sets forth a flow diagram of method steps for training the style-based generator 150 of FIGS. 1-3, according to various embodiments. Although the method steps are described in conjunction with the systems of FIG. 1-3, persons of ordinary skill in the art will understand that any system configured to perform the method steps, in any order, is within the scope of the present disclosure.

As shown, a method 700 begins at step 702, where the model trainer 116 receives, as training data, low-resolution appearance maps and corresponding style labels. The style labels indicate semantic styles, such as particular expressions, genders, ages, identities, ethnicities, etc. or combinations thereof that are associated with each of the low-resolution appearance maps. As described, each semantic style can be associated with a corresponding style vector, and multiple style vectors can be combined using, e.g., a weighted sum. In some embodiments, the low-resolution appearance maps are downscaled and downsampled versions of high-resolution appearance maps obtained from captured images and/or videos of human faces.

At step 704, the model trainer 116 trains the style-based generator 150 to generate low-resolution appearance maps given style vector(s) as input. In some embodiments, the training minimizes a reconstruction loss and jointly optimizes the initial tensor 300 (or multiple such tensors), convolution and AdaIN layers within the semantics transfer blocks 302, the style vector(s) 204, and weights used in the weight sum 242 in each semantics transfer block 302. Further, a progressive training technique can be employed in some embodiments. As described above, each semantics transfer block 302 controls the generation at a single scale. At the start of progressive training, only the semantics transfer block 302 corresponding to a lowest output resolution is trained using low-resolution ground truth data. Once the semantics transfer block 302 corresponding to the lowest resolution has been trained, the model trainer 116 can append a new semantics transfer block 302 to generate appearance maps at the next highest resolution and perform additional training using ground truth data at the next highest resolution. In this manner, additional semantics transfer blocks 302 can be gradually trained in succession.

Figure 8:
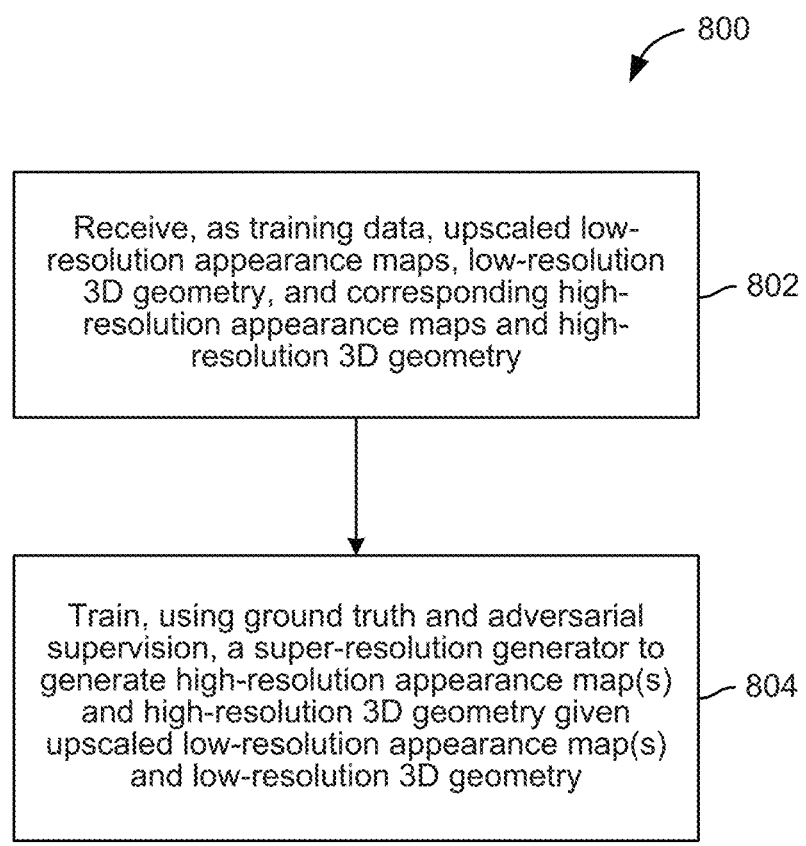
FIG. 8 sets forth a flow diagram of method steps for training the super-resolution generator of FIGS. 1-2, according to various embodiments.

FIG. 8 sets forth a flow diagram of method steps for training the super-resolution generator of FIGS. 1-2, according to various embodiments. Although the method steps are described in conjunction with the systems of FIG. 1-2, persons of ordinary skill in the art will understand that any system configured to perform the method steps, in any order, is within the scope of the present disclosure.

As shown, a method 800 begins at step 802, where the model trainer 116 receives, as training data, upscaled low-resolution appearance maps, low-resolution 3D geometry, and corresponding high-resolution appearance maps and high-resolution 3D geometry. As described, the high-resolution appearance maps and high-resolution 3D geometry can be obtained from captured images and/or videos of human faces. In such cases, the low-resolution appearance maps and upscaled low-resolution appearance maps can be obtained by downsampling and downscaling the high-resolution appearance maps, or downscaling the high-resolution appearance maps, respectively.

At step 804, the model trainer 116 trains, using ground truth and adversarial supervision, the super-resolution generator 152 to generate high-resolution appearance map(s) and high-resolution 3D geometry given upscaled low-resolution appearance map(s) and low-resolution 3D geometry. In some embodiments, the training includes using one or more discriminator models that contribute to an adversarial loss and ensure that details in high-resolution map(s) generated by the super-resolution generator 152 align with the corresponding high-resolution 3D geometry in the training data. In such cases, the discriminator models can be Markovian patch-based discriminators, each of which operate at increasingly finer image scales to supervise the super-resolution generator 152. For ground truth supervision with high-resolution appearance maps from the training data, an L1 loss and Visual Geometry Group (VGG)-19 perceptual loss can be used to train the super-resolution generator 152 in some embodiments. Further, each discriminator can be trained using the Wasserstein Generative Adversarial Network with Gradient Penalty (WGAN-GP) loss in some embodiments. In addition, a learning rate of 1e-4 and the Adam optimizer can be used during training in some embodiments.

Figure 9:
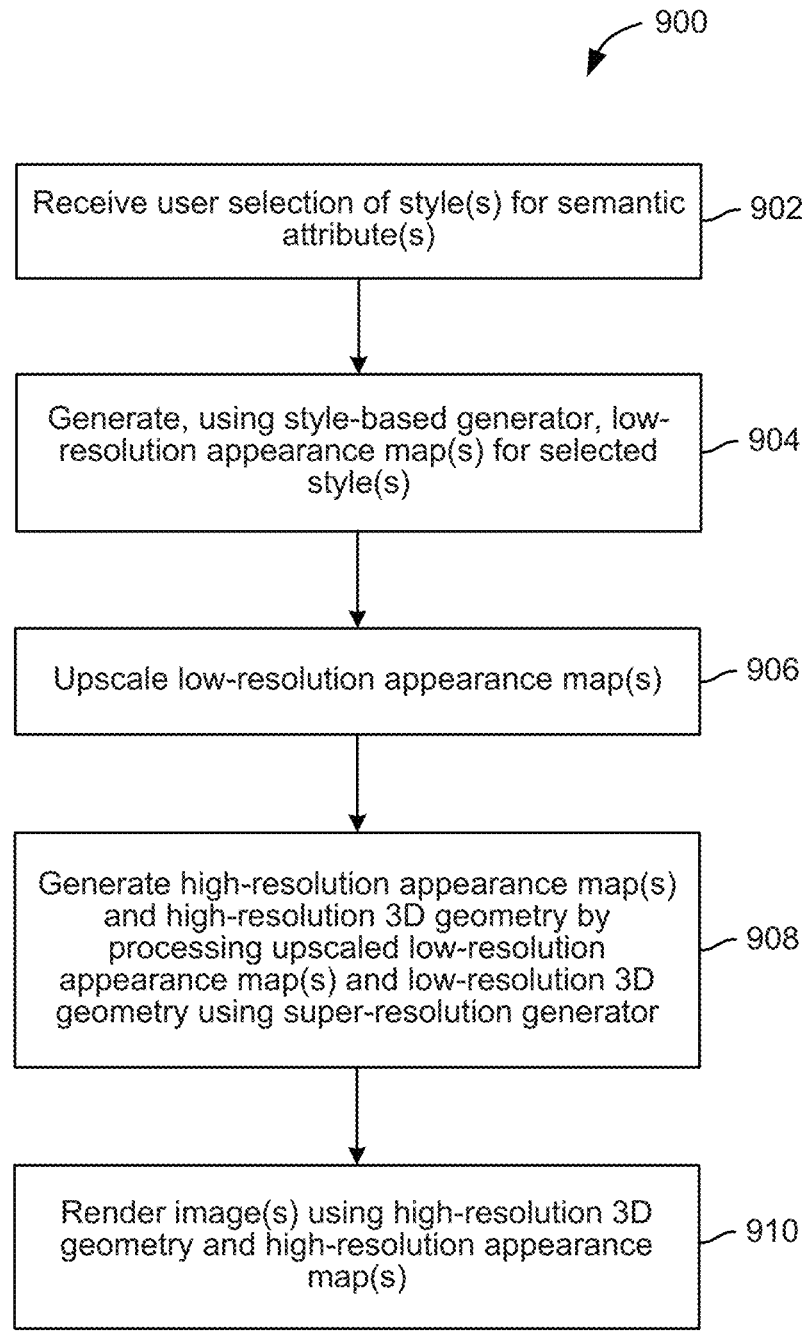
FIG. 9 sets forth a flow diagram of method steps for rendering a digital face, according to various embodiments.

FIG. 9 sets forth a flow diagram of method steps for rendering a digital face, according to various embodiments. Although the method steps are described in conjunction with the systems of FIG. 1-4, persons of ordinary skill in the art will understand that any system configured to perform the method steps, in any order, is within the scope of the present disclosure.

As shown, a method 900 begins at step 902, where the face generating application 146 receives a user selection of style(s) for different semantic attribute(s). As described, the semantic attribute(s) can include expression, gender, age, identity, ethnicity, and the like, each of which is associated with one or more predefined styles. In embodiments, the user can input a selection of styles in any technically feasible manner, such as via sliders or text input fields on a graphical user interface. Further, the user can select a single style for a semantic attribute or a combination of styles. For example, the user could select a single style for an age attribute and a combination of different styles for expression, identity, and/or ethnicity attributes.

At step 904, the face generating application 146 generates, using the style-based generator 150, one or more low-resolution appearance maps for the selected styles. As described, the face generating application 146 can determine style vectors associated with the selected styles and input such style vectors, along with initial tensor(s), into the style-based generator 150. Given such inputs, the style-based generator 150 can output low-resolution appearance map(s).

At step 906, the face generating application 146 upscales the low-resolution appearance map(s). As described, upscaling the low-resolution appearance map(s) can include performing a bilinear upsampling operation in some embodiments.

At step 908, the face generating application 146 generates high-resolution appearance map(s) and high-resolution 3D geometry by processing the upscaled low-resolution appearance map(s) and low-resolution 3D geometry using the super-resolution generator 152. The low-resolution 3D geometry can be generated in any technically feasible manner, such as using the non-linear model disclosed in U.S. patent application Ser. No. 16/809,495. As described, the low-resolution 3D geometry can be represented in a 2D format (e.g., as an image whose pixels represent 3D coordinates or as a displacement map) in some embodiments. In some embodiments, the super-resolution generator 152 is trained to take the low-resolution 3D geometry and upscaled low-resolution appearance map(s) as inputs and to output corresponding high-resolution appearance map(s) and high-resolution 3D geometry. In alternative embodiments, the super-resolution generator 152 may take as inputs a low-resolution 3D geometry and upscaled low-resolution appearance map(s) that are created manually or generated according to other techniques.

At step 910, the face generating application 146 renders one or more images using the high-resolution 3D geometry and the high-resolution appearance map(s). The rendering image(s) can include frames of a video or standalone image(s). Examples of such rendered images are described above in conjunction with FIGS. 5-6.

Although discussed herein primarily with respect to digital faces of humans, some embodiments may also be used to generate and render other types of digital faces, such as animal faces, or even objects other than faces. Although discussed herein primarily with respect to rendering images, high-resolution appearance map(s) generated by the super-resolution generator 152 can also be used (e.g., along with the variational autoencoder disclosed in U.S. patent application Ser. No. 16/809,495) to retarget or animate a digital face in real time through blendweights or facial landmarks. Although expression, gender, age, identity, and ethnicity are described herein as examples of semantic attributes, other semantic attributes may be used in alternative embodiments. For example, "bearded-ness" could be a semantic attribute, with bearded and not bearded styles.

In sum, techniques are disclosed for generating digital faces. In some embodiments, a style-based generator receives as inputs initial tensor(s) and style vector(s) corresponding to user-selected semantic attribute styles, such as a desired expression, gender, age, identity, and/or ethnicity of a digital face. The style-based generator is trained to process such inputs and output low-resolution appearance map(s) for the digital face, such as a texture map, a normal map, and/or a specular roughness map. The low-resolution appearance map(s) are further processed using a super-resolution generator that is trained to take the low-resolution appearance map(s) and low-resolution 3D geometry of the digital face as inputs and output high-resolution appearance map(s) that align with a high-resolution 3D geometry of the digital face. Such high-resolution appearance map(s) and high-resolution 3D geometry can be used to render stand-alone images or the frames of a video that include the digital face.

At least one technical advantage of the disclosed techniques relative to the prior art is that the disclosed techniques disentangle styles associated with different semantic attributes, such as expression, gender, age, identity, ethnicity, etc., when generating facial appearance maps. This approach enables these types of semantic attributes to be separately controlled by a user via the styles. In addition, the disclosed techniques generate facial appearance maps including details that are more aligned with the details in 3D facial geometry. Such facial appearance maps and 3D facial geometry can be used to render more realistic-looking digital faces relative to conventional approaches. These technical advantages represent one or more technological improvements over prior art approaches.

1. In some embodiments, a computer-implemented method for rendering one or more images of a digital face comprises generating, via a first machine learning model, one or more first appearance maps based on a user selection of one or more styles associated with one or more attributes of a digital face, generating, via a second machine learning model, one or more second appearance maps and a first three-dimensional (3D) geometry associated with the digital face based on the one or more first appearance maps and a second 3D geometry associated with the digital face, and rendering one or more images including the digital face based on the one or more second appearance maps and the first 3D geometry.

2. The computer-implemented method of clause 1, wherein the one or more first appearance maps have a lower resolution than the one or more second appearance maps, and the second 3D geometry has a lower resolution than the first 3D geometry.

3. The computer-implemented method of clauses 1 or 2, wherein generating the one or more first appearance maps based on the user selection of one or more styles comprises controlling one or more adaptive instance normalization (AdaIN) operations based on the user selection of one or more styles.

4. The computer-implemented method of any of clauses 1-3, wherein the one or more AdaIN operations are performed in conjunction with one or more convolution operations.

5. The computer-implemented method of any of clauses 1-4, wherein the first machine learning model comprises a plurality of semantics transfer blocks, and performing the one or more AdaIN operations in conjunction with the one or more convolution operations comprises, for each semantics transfer block included in the plurality of semantics transfer blocks performing multiple sets of convolution operations and AdaIN operations in parallel, determining a weighted sum of outputs of the multiple sets of convolution operations and AdaIN operations, and upscaling the weighted sum of outputs.

6. The computer-implemented method of any of clauses 1-5, wherein the one or more second appearance maps include at least one of a texture map, a normal map, or a specular roughness map.

7. The computer-implemented method of any of clauses 1-6, wherein the one or more attributes of the digital face include at least one of expression, gender, age, identity, or ethnicity.

8. The computer-implemented method of any of clauses 1-7, wherein the second machine learning model comprises a super-resolution generator.

9. The computer-implemented method of any of clauses 1-8, wherein the first 3D geometry associated with the digital face conveys a non-neutral facial expression.

10. In some embodiments, a non-transitory computer-readable storage medium includes instructions that, when executed by a processing unit, cause the processing unit to perform steps for rendering one or more images of a digital face, the steps comprising generating, via a first machine learning model, one or more first appearance maps based on a user selection of one or more styles associated with one or more attributes of a digital face, generating, via a second machine learning model, one or more second appearance maps and a first three-dimensional (3D) geometry associated with the digital face based on the one or more first appearance maps and a second 3D geometry associated with the digital face, and rendering one or more images including the digital face based on the one or more second appearance maps and the first 3D geometry.

11. The computer-readable storage medium of clause 10, wherein generating the one or more first appearance maps based on the user selection of one or more styles comprises controlling one or more adaptive instance normalization (AdaIN) operations based on the user selection of one or more styles.

12. The computer-readable storage medium of clauses 10 or 11, wherein the first machine learning model comprises a plurality of semantics transfer blocks, and generating the one or more first appearance maps based on the user selection of one or more styles includes, for each semantics transfer block included in the plurality of semantics transfer blocks performing multiple sets of convolution operations and AdaIN operations in parallel, determining a weighted sum of outputs of the multiple sets of convolution operations and AdaIN operations, and upscaling the weighted sum of outputs.

13. The computer-readable storage medium of any of clauses 10-12, wherein one or more weights used in the weighted sum of outputs, the multiple sets of convolution operations and AdaIN operations, one or more initial tensors, and one or more style vectors associated with the one or more attributes of the digital face are determined while training the first machine learning model.

14. The computer-readable storage medium of any of clauses 10-13, wherein the first machine learning model is trained using a progressive training technique.

15. The computer-readable storage medium of any of clauses 10-14, wherein the second machine learning model is trained using ground truth and adversarial learning techniques.

16. The computer-readable storage medium of any of clauses 10-15, wherein the one or more first appearance maps have a lower resolution than the one or more second appearance maps, and the second 3D geometry has a lower resolution than the first 3D geometry.

17. The computer-readable storage medium of any of clauses 10-16, wherein the one or more second appearance maps include at least one of a texture map, a normal map, or a specular roughness map.

18. The computer-readable storage medium of any of clauses 10-17, wherein the one or more attributes of the digital face include at least one of expression, gender, age, identity, or ethnicity.

19. The computer-readable storage medium of any of clauses 10-18, wherein the second machine learning model comprises a super-resolution generator.

20. In some embodiments, a computing device comprises a memory storing an application, and a processor coupled to the memory, wherein when executed by the processor, the application causes the processor to generate, via a first machine learning model, one or more first appearance maps based on a user selection of one or more styles associated with one or more attributes of a digital face, generate, via a second machine learning model, one or more second appearance maps and a first three-dimensional (3D) geometry associated with the digital face based on the one or more first appearance maps and a second 3D geometry associated with the digital face, and render one or more images including the digital face based on the one or more second appearance maps and the first 3D geometry.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable.

The flowchart and block diagrams in the figures illustrate the architecture, functionality, and operation of possible implementations of systems, methods and computer program products according to various embodiments of the present disclosure. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method for rendering one or more images of a digital face, the method comprising:
    generating, via a first machine learning model, one or more first appearance maps based on a user selection of one or more styles associated with one or more attributes of a digital face;
    generating, via a second machine learning model, one or more second appearance maps and a first three-dimensional (3D) geometry associated with the digital face based on jointly upsampling the one or more first appearance maps and a second 3D geometry associated with the digital face, wherein the one or more second appearance maps are aligned with the first 3D geometry; and
    rendering one or more images including the digital face based on the one or more second appearance maps and the first 3D geometry.

2. The computer-implemented method of claim 1, wherein the one or more first appearance maps have a lower resolution than the one or more second appearance maps, and the second 3D geometry has a lower resolution than the first 3D geometry.

3. The computer-implemented method of claim 1, wherein generating the one or more first appearance maps based on the user selection of one or more styles comprises controlling one or more adaptive instance normalization (AdaIN) operations based on the user selection of one or more styles.

4. The computer-implemented method of claim 3, wherein the one or more AdaIN operations are performed in conjunction with one or more convolution operations.

5. The computer-implemented method of claim 4, wherein the first machine learning model comprises a plurality of semantics transfer blocks, and performing the one or more AdaIN operations in conjunction with the one or more convolution operations comprises, for each semantics transfer block included in the plurality of semantics transfer blocks:
  performing multiple sets of convolution operations and AdaIN operations in parallel;
  determining a weighted sum of outputs of the multiple sets of convolution operations and AdaIN operations; and
  upscaling the weighted sum of outputs.

6. The computer-implemented method of claim 1, wherein the one or more second appearance maps include at least one of a texture map, a normal map, or a specular roughness map.

7. The computer-implemented method of claim 1, wherein the one or more attributes of the digital face include at least one of expression, gender, age, identity, or ethnicity.

8. The computer-implemented method of claim 1, wherein the second machine learning model comprises a super-resolution generator.

9. The computer-implemented method of claim 1, wherein the first 3D geometry associated with the digital face conveys a non-neutral facial expression.

10. A non-transitory computer-readable storage medium including instructions that, when executed by a processing unit, cause the processing unit to perform steps for rendering one or more images of a digital face, the steps comprising:
  generating, via a first machine learning model, one or more first appearance maps based on a user selection of one or more styles associated with one or more attributes of a digital face;
  generating, via a second machine learning model, one or more second appearance maps and a first three-dimensional (3D) geometry associated with the digital face based on jointly upsampling the one or more first appearance maps and a second 3D geometry associated with the digital face, wherein the one or more second appearance maps are aligned with the first 3D geometry; and
  rendering one or more images including the digital face based on the one or more second appearance maps and the first 3D geometry.

11. The computer-readable storage medium of claim 10, wherein generating the one or more first appearance maps based on the user selection of one or more styles comprises controlling one or more adaptive instance normalization (AdaIN) operations based on the user selection of one or more styles.

12. The computer-readable storage medium of claim 11, wherein the first machine learning model comprises a plurality of semantics transfer blocks, and generating the one or more first appearance maps based on the user selection of one or more styles includes, for each semantics transfer block included in the plurality of semantics transfer blocks:
  performing multiple sets of convolution operations and AdaIN operations in parallel;
  determining a weighted sum of outputs of the multiple sets of convolution operations and AdaIN operations; and
  upscaling the weighted sum of outputs.

13. The computer-readable storage medium of claim 12, wherein one or more weights used in the weighted sum of outputs, the multiple sets of convolution operations and AdaIN operations, one or more initial tensors, and one or more style vectors associated with the one or more attributes of the digital face are determined while training the first machine learning model.

14. The computer-readable storage medium of claim 10, wherein the first machine learning model is trained using a progressive training technique.

15. The computer-readable storage medium of claim 10, wherein the second machine learning model is trained using ground truth and adversarial learning techniques.

16. The computer-readable storage medium of claim 10, wherein the one or more first appearance maps have a lower resolution than the one or more second appearance maps, and the second 3D geometry has a lower resolution than the first 3D geometry.

17. The computer-readable storage medium of claim 10, wherein the one or more second appearance maps include at least one of a texture map, a normal map, or a specular roughness map.

18. The computer-readable storage medium of claim 10, wherein the one or more attributes of the digital face include at least one of expression, gender, age, identity, or ethnicity.

19. The computer-readable storage medium of claim 10, wherein the second machine learning model comprises a super-resolution generator.

20. A computing device comprising:
  a memory storing an application; and
  a processor coupled to the memory, wherein when executed by the processor, the application causes the processor to:
    generate, via a first machine learning model, one or more first appearance maps based on a user selection of one or more styles associated with one or more attributes of a digital face;
    generate, via a second machine learning model, one or more second appearance maps and a first three-dimensional (3D) geometry associated with the digital face based on jointly upsampling the one or more first appearance maps and a second 3D geometry associated with the digital face, wherein the one or more second appearance maps are aligned with the first 3D geometry; and
    render one or more images including the digital face based on the one or more second appearance maps and the first 3D geometry.

* * * * *

UNITED STATES PATENT AND TRADEMARK OFFICE
CERTIFICATE OF CORRECTION

PATENT NO. : 11,257,276 B2
APPLICATION NO. : 16/895734
DATED : February 22, 2022
INVENTOR(S) : Prashanth Chandran, Dominik Thabo Beeler and Derek Edward Bradley It is certified that error appears in the above-identified patent and that said Letters Patent is hereby corrected as shown below:

On the Title Page

Item (73) Assignees:
Please delete "DISNEY ENTERPRISES, INC., Burbank, CA (US); ETH ZURICH, (EIDGENÖSSISCHE TECHNISCHE HOCHSCHULE ZÜRICH), Zurich (CH)" and insert --DISNEY ENTERPRISES, INC., Burbank, CA (US); ETH ZÜRICH, Zürich (CH)--.

Signed and Sealed this
First Day of November, 2022

Katherine Kelly Vidal
*Director of the United States Patent and Trademark Office*